(12) United States Patent
Päbel et al.

(10) Patent No.: US 9,162,295 B2
(45) Date of Patent: Oct. 20, 2015

(54) ROTATABLE TOOL FOR CHIP REMOVING MACHINING AS WELL AS A LOOSE TOP AND A BASIC BODY THEREFOR

(75) Inventors: Helena Päbel, Sandviken (SE); Magnus Aare, Sandviken (SE)

(73) Assignee: Sandvik Intellectual Property AB, Sandviken (SE)

(*) Notice: Subject to any disclaimer, the term of this patent is extended or adjusted under 35 U.S.C. 154(b) by 1119 days.

(21) Appl. No.: 13/042,396

(22) Filed: Mar. 7, 2011

(65) Prior Publication Data

US 2011/0236145 A1 Sep. 29, 2011

(30) Foreign Application Priority Data

Mar. 26, 2010 (SE) ...................................... 1050288

(51) Int. Cl.
*B23B 51/02* (2006.01)

(52) U.S. Cl.
CPC ............. *B23B 51/02* (2013.01); *B23B 2240/36* (2013.01); *B23B 2251/02* (2013.01); *B23B 2251/50* (2013.01); *B23B 2265/12* (2013.01); *Y10T 407/24* (2015.01); *Y10T 408/907* (2015.01); *Y10T 408/90993* (2015.01)

(58) Field of Classification Search
CPC .. B23B 2240/36; B23B 2251/02; B23B 51/02
USPC .......... 408/144, 226, 227, 230, 231, 233, 200
See application file for complete search history.

(56) References Cited

U.S. PATENT DOCUMENTS

| 2,073,430 A | 3/1937 | Tautz |
| 2,158,120 A * | 5/1939 | Hirschberg ................... 175/417 |
| 2,397,382 A | 3/1946 | Smith |
| 3,207,015 A | 9/1965 | Ditto |

(Continued)

FOREIGN PATENT DOCUMENTS

| CN | 11603070 | 9/1997 |
| CN | 1258240 | 6/2000 |

(Continued)

OTHER PUBLICATIONS

First Office Action (with English Translation) in Chinese Patent Application No. 201110080072.8, dated Mar. 5, 2014.

(Continued)

*Primary Examiner* — Sunil K Singh
*Assistant Examiner* — Ryan Rufo
(74) *Attorney, Agent, or Firm* — Morgan, Lewis & Bockius LLP

(57) ABSTRACT

A rotatable tool for chip removing machining, including a basic body having front and rear ends between which there extends a first geometrical center axis, and a loose top having front and rear ends between which a second geometrical center axis extends. The front end of the basic body includes a jaw, which is delimited by two drivers and an intermediate bottom and in which a part of the loose top is received. A centering pin protrudes axially rearward from the loose top and is inserted in an axial center hole, which mouths in the bottom of the jaw and in which a threaded hole mouths for a screw co-operating with the center pin. The center hole includes a cylindrical support surface, which is concentric with the center axis of the basic body and against which the centering pin of the loose top is pressed by the screw.

20 Claims, 6 Drawing Sheets

(56) References Cited

U.S. PATENT DOCUMENTS

| | | | |
|---|---|---|---|
| 5,904,455 | A | 5/1999 | Krenzer et al. |
| 5,957,631 | A | 9/1999 | Hecht |
| 6,012,881 | A | 1/2000 | Scheer |
| 6,059,492 | A | 5/2000 | Hecht |
| 6,506,003 | B1 | 1/2003 | Erickson |
| 6,601,486 | B2 | 8/2003 | Hansson et al. |
| 6,623,202 | B2 | 9/2003 | Hansson et al. |
| 6,783,307 | B2 | 8/2004 | Lindblom |
| 6,783,308 | B2 | 8/2004 | Lindblom |
| 6,840,717 | B2 | 1/2005 | Eriksson |
| 6,899,495 | B2 | 5/2005 | Hansson et al. |
| 7,114,892 | B2 | 10/2006 | Hansson |
| 7,134,816 | B2 | 11/2006 | Brink |
| 7,309,196 | B2 | 12/2007 | Ruy Forta de Souza |
| 7,377,730 | B2 | 5/2008 | Hecht et al. |
| 7,407,350 | B2 | 8/2008 | Hecht et al. |
| 7,513,724 | B2 | 4/2009 | Kakai |
| 7,611,311 | B2 | 11/2009 | Kakai et al. |
| 7,625,161 | B1 | 12/2009 | Ruy Forta de Souza |
| 7,713,004 | B2 | 5/2010 | Lehto et al. |
| 8,021,088 | B2 | 9/2011 | Hecht |
| 8,226,333 | B2 | 7/2012 | Kakai et al. |
| 8,308,402 | B2 | 11/2012 | Brink |
| 8,449,227 | B2 | 5/2013 | Danielsson |
| 8,556,552 | B2 | 10/2013 | Hecht |
| 8,678,722 | B2 | 3/2014 | Aare |
| 8,764,354 | B2 * | 7/2014 | Schuffenhauer et al. ........ 408/57 |
| 2005/0098359 | A1 | 5/2005 | Lee |
| 2006/0127194 | A1 * | 6/2006 | Schafer ........................ 408/231 |
| 2007/0031203 | A1 * | 2/2007 | Osawa et al. .................. 408/231 |
| 2007/0081872 | A1 | 4/2007 | Blomstedt et al. |
| 2007/0081873 | A1 | 4/2007 | Blomstedt et al. |
| 2008/0193237 | A1 | 8/2008 | Men et al. |
| 2008/0193238 | A1 | 8/2008 | Hecht |
| 2009/0116920 | A1 | 5/2009 | Bae |
| 2010/0254779 | A1 | 10/2010 | Wedner |
| 2010/0259017 | A1 * | 10/2010 | Vasudeva et al. ................ 279/76 |
| 2010/0266357 | A1 | 10/2010 | Kretzschmann et al. |
| 2010/0322727 | A1 | 12/2010 | Päbel |
| 2010/0322729 | A1 | 12/2010 | Päbel |
| 2010/0322731 | A1 | 12/2010 | Aare |
| 2011/0097168 | A1 * | 4/2011 | Jager et al. .................... 408/200 |
| 2011/0110739 | A1 | 5/2011 | Frisendahl |
| 2011/0194907 | A1 * | 8/2011 | Guy .............................. 409/234 |
| 2011/0236145 | A1 | 9/2011 | Päbel et al. |

FOREIGN PATENT DOCUMENTS

| | | | |
|---|---|---|---|
| CN | 1512927 | 7/2004 | |
| CN | 1616170 | 5/2005 | |
| CN | 1956813 | 5/2007 | |
| CN | 101048251 | 10/2007 | |
| CN | 101927368 | 12/2010 | |
| CN | 101927370 | 12/2010 | |
| DE | 4435857 | 4/1996 | |
| DE | 102007044095 | 3/2009 | |
| EP | 0118806 | 9/1984 | |
| EP | 0 385 280 A1 | 9/1990 | |
| EP | 742065 A2 * | 11/1996 | ............... B23C 5/10 |
| EP | 1013367 | 6/2000 | |
| EP | 1273373 | 1/2003 | |
| EP | 1 533 061 A | 5/2005 | |
| EP | 1 533 061 A1 * | 5/2005 | ............. B23B 51/02 |
| EP | 2 266 734 | 12/2010 | |
| EP | 2 266 736 | 12/2010 | |
| GB | 2 228 695 A * | 9/1990 | ........... B23B 31/117 |
| JP | 2002501441 | 1/2002 | |
| JP | 2003-071622 | 3/2003 | |
| JP | 2003-291013 A * | 10/2003 | ............. B23B 51/00 |
| JP | 2004527391 | 9/2004 | |
| JP | 2005169542 | 6/2005 | |
| JP | 2006167871 | 6/2006 | |
| JP | 2010517800 | 5/2010 | |
| JP | 2011-005631 A * | 1/2011 | ............. B23B 51/00 |
| WO | WO 2005/115667 | 12/2005 | |
| WO | WO 2008/072840 | 6/2008 | |
| WO | WO 2008/099378 | 9/2008 | |
| WO | WO 2009/037020 | 3/2009 | |
| WO | WO 2009/128775 | 10/2009 | |

OTHER PUBLICATIONS

Office Action (with English Translation) in Japanese Patent Application No. 2011-068282, dated Oct. 21, 2014.

* cited by examiner

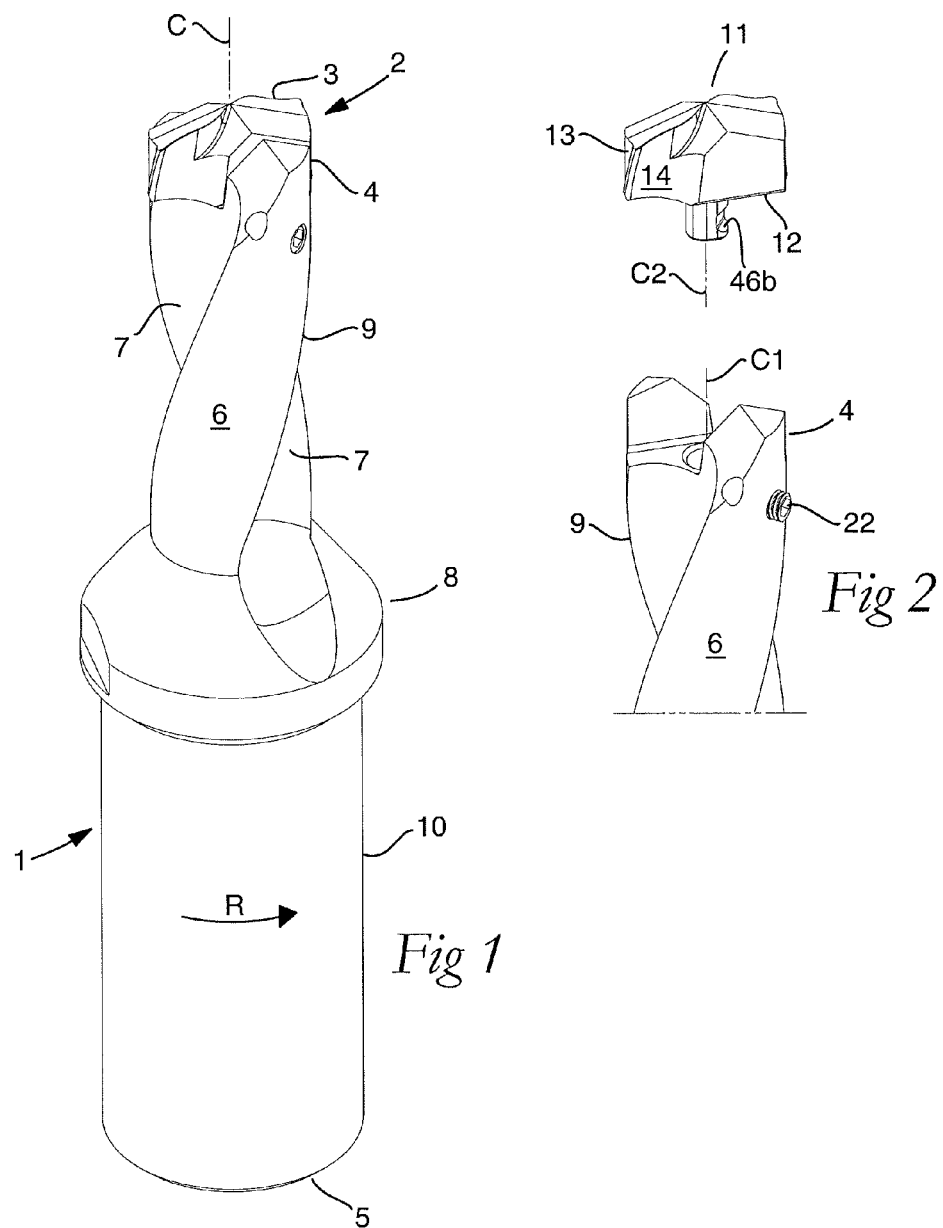

ROTATABLE TOOL FOR CHIP REMOVING MACHINING AS WELL AS A LOOSE TOP AND A BASIC BODY THEREFOR

This Application claims priority under 35 U.S.C. §119 to Swedish Patent Application No. 1050288-8, filed on Mar. 26, 2010, which is incorporated by reference herein in its entirety.

FIELD OF THE INVENTION

The present invention relates generally to a rotatable tool for chip removing machining of the type that includes a basic body having front and rear ends between which there extends a first geometrical center axis around which the basic body is rotatable in a predetermined direction of rotation, and a loose top having front and rear ends between which a second geometrical center axis extends. The front end of the basic body includes a jaw, which is delimited by two drivers and an intermediate bottom and in which a part of the loose top is received. A centering pin protrudes axially rearward from the loose top and is inserted in an axial center hole, which mouths in the bottom of the jaw and in which a threaded hole mouths for a screw co-operating with the center pin.

The invention also relates generally to a loose top for the type of tool in question as well as a basic body. Tools of the kind in question are suitable for chip removing or cutting machining of workpieces of metal, such as steel, cast iron, aluminium, titanium, yellow metals, etc. The tools may also be used for the machining of composite material of different types.

BACKGROUND OF THE INVENTION

More recently, drilling tools as well as milling tools have been developed, which, contrary to integral solid tools, are composed of two parts, viz. a basic body and a head detachably connected with the same and thereby being replaceable, in which head the requisite cutting edges are included. In such a way, the major part of the tool can be manufactured from a comparatively inexpensive material having a moderate modulus of elasticity, such as steel, while a smaller part, viz. the head, can be manufactured from a harder and more expensive material, such as cemented carbide, cermet, ceramics and the like, which gives the cutting edges a good chip-removing capacity, good machining precision and long service life. In other words, the head forms a wear part, which can be discarded after wear-out, while the basic body can be re-used several times. A now recognized denomination of such, cutting edge-carrying heads is "loose tops", which henceforth will be used herein together with the concept "loose top tools".

On rotatable tools of the loose top type, several requirements are made, one of which is that the loose top should be held centered in an exact and reliable way in relation to the basic body. Accordingly, each unintentional eccentricity between the center axis of the loose top and the center axis of the basic body should not be more than 0.01 mm. Another requirement or desire from the users' side is that the loose top should be mountable and dismountable in a rapid and convenient way without risk of incorrect mounting. Most preferably, mounting and dismounting should be possible to be carried out without the basic body necessarily having to be removed from the driving machine.

Drilling tools as well as milling tools (shank-end mills) of the loose top type are widely described in the patent literature and may be divided into a number of different categories depending on the ideas on which the designs are based. Thus, certain tools use loose tops having rear pins that entirely or partly (together with other coupling details) fulfill the task of centering the loose top in relation to the basic body. To this category belongs among others the tool disclosed in U.S. Pat. No. 6,012,881, which discloses a loose top drill in which a rear coupling part of the loose top is axially inserted in a jaw between two non-compliant drivers, the insides of which include axially extending, torque-transferring ridges that engage the corresponding chutes in the coupling part included in the loose top, besides which a centric pin protruding rearward from the coupling part is inserted in a center hole mouthing in the bottom of the jaw. With the pin, a screw mounted in a radial, threaded hole in the basic body co-operates, which has the purpose of locking the loose top in relation to the basic body. In that connection, the center pin is cylindrical and insertable at a close (form fitting) fit in a likewise cylindrical center hole, in order to, together with concave and convex contact surfaces of the drivers and the coupling part, respectively, fulfill the purpose of centering the loose top. However, the concurrent requirements of fit not only between the center pin and the hole, but also between the drivers and the coupling part, impose extreme, not to say unattainable, requirements of manufacturing precision. In addition, a conflicting problem will arise if good precision peradventure would be achieved, viz. that the mounting and dismounting of the loose top become difficult to carry out as a consequence of the centering pin requiring great force to be pushed into and pulled out of, respectively, the hole.

With the purpose of obviating the above-mentioned disadvantages of the tool according to U.S. Pat. No. 6,012,881, it has by EP 2266736 and EP 2266734 been proposed to form the centering pin of the loose top with, on one hand, an essentially semi-cylindrical contact surface concentric with the center axis of the loose top, and on the other hand a diametrically opposite clearance surface, the first-mentioned one of which can—by means of the screw of the tool—be pressed against the inside of a cylindrical centering hole in the basic body. In such a way, the centering pin can be given a cross-sectional area that is smaller than the cross-sectional area of the hole, the mounting and dismounting of the loose top being facilitated without the exact centering of the loose top being jeopardized. However, in this case, a 50% risk arises of incorrect mounting of the loose top in connection with the centering pin being inserted into the hole, in that the contact surface of the pin can be turned toward any half of the internal, cylindrical hole wall.

The present invention aims at obviating not only the serious disadvantages inherent in the loose top tool according to U.S. Pat. No. 6,012,881, but also the practical mounting inconveniences that have turned out to be associated with the tools and loose tops that are objects of EP 2266736 and EP 2266734.

An object of the invention to provide a loose top tool the loose top of which can, on one hand, be centered in an accurate way in relation to the basic body of the tool, and on the other hand be mounted in a simple way without risk of incorrect mounting. In other words, the operator should without mental effort be able to, in a foolproof way, mount the loose top in only one predetermined position.

Another object of the invention is to provide a loose top tool, the two main components of which, i.e., the basic body and the loose top, respectively, should be manufacturable in an effective and economical way while achieving the desired simplicity of the mounting.

Yet another object of the invention is to provide a loose top the centering pin of which is strong and robust.

SUMMARY OF THE INVENTION

In an embodiment, the invention provides a rotatable tool for chip removing machining, including a basic body having front and rear ends between which there extends a first geometrical center axis (C1) around which the basic body is rotatable in a predetermined direction of rotation, and a loose top having front and rear ends between which a second geometrical center axis (C2) extends. The front end of the basic body includes a jaw, which is delimited by two drivers and an intermediate bottom and in which a part of the loose top is received. A centering pin protrudes axially rearward from the loose top and is inserted in an axial center hole, which mouths in the bottom of the jaw and in which a threaded hole mouths for a screw co-operating with the center pin. The center hole includes a cylindrical support surface, which is concentric with the center axis (C1) of the basic body and against which the centering pin of the loose top is pressed by the screw. The centering pin of the loose top includes first and second diametrically opposed, external surfaces, each having an axial extension and a peripheral extension, the first external surface forming a contact surface that is pressed against the support surface of the center hole and extends tangentially between two axially extending boundary generatrices, which are situated along an imaginary circumscribed circle (S2) having a center (MP2) coinciding with the center axis (C2) of the loose top, and between which an arc angle (β) is less than 180°, the second external surface forming a clearance surface that lacks contact with the inside of the center hole as a consequence of the cross-sectional area of the centering pin being smaller than the cross-sectional area of the center hole. The circumscribed circle (S2) has a radius (r2) that is equally great as the radius (r1) of an inscribed circle (S1) along the cylindrical support surface of the center hole. A greatest radial distance (RD2) between the center axis (C2) of the loose top and a point on the clearance surface of the centering pin is greater than the radius (r2) of the circumscribed circle (S2) but smaller than a corresponding distance (RD1) between the center axis (C1) of the basic body and a clearance surface situated in the center hole and opposite the support surface.

In another embodiment, the invention provides a loose top for rotatable tools for chip removing machining, including front and rear ends between which a geometrical center axis (C2) extends. An axially rearwardly protruding centering pin includes first and second diametrically opposed, external surfaces, each having an axial extension and a peripheral extension, the first external surface forming a contact surface that extends peripherally between two axially extending boundary generatrices, which are situated along an imaginary circumscribed circle (S2) having a center (MP2) coinciding with the center axis (C2), and between which an arc angle (β) is less than 180°, the second external surface forming a clearance surface. A greatest radial distance (RD2) between the center axis (C2) and a point on the clearance surface is greater than the radius (r2) of the circumscribed circle (S2).

In yet another embodiment, the invention provides a basic body for rotatable tools for chip removing machining, including an envelope surface and front and rear ends, between which a geometrical center axis (C1) extends. The front end includes a jaw delimited by two drivers and an intermediate bottom in which an axially extending center hole mouths, a hole for a screw extending between the center hole and the envelope surface. The center hole is delimited by a cylindrical support surface, which is concentric with the center axis (C1) and along which a circle (S1) having a radius (r1) is inscribed, and by an opposite clearance surface situated outside the inscribed circle (S1).

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1 is a perspective view of a loose top tool in the form of a drill, the basic body and loose top of which are shown in an assembled, operative state;

FIG. 2 is a partly sectioned exploded view showing the loose top separated from the basic body;

DETAILED DESCRIPTION OF THE PREFERRED EMBODIMENTS

Figure 3:
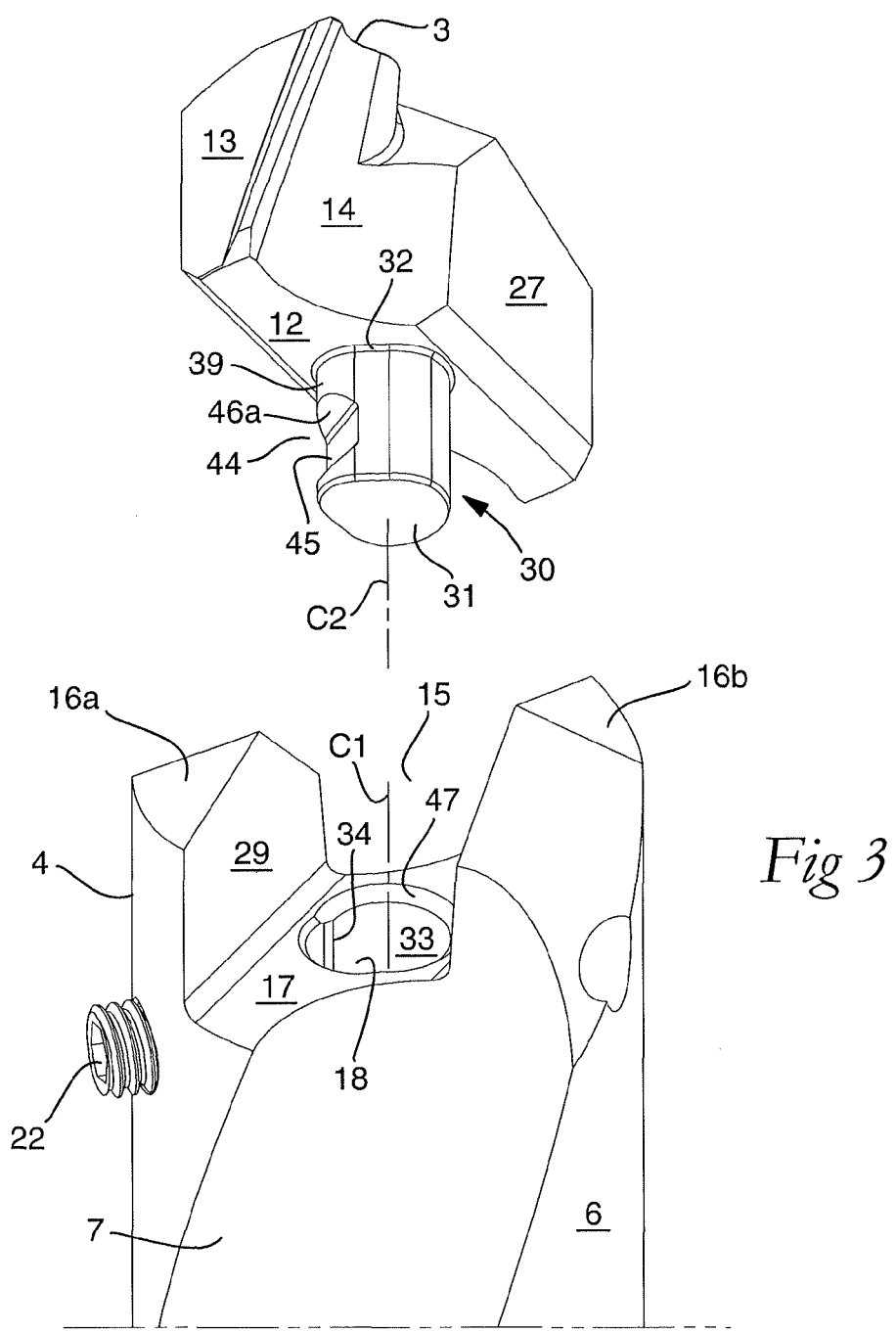
FIG. 3 is an enlarged exploded view showing a jaw included in the basic body in top perspective view and the loose top in bottom perspective view.

In the drawings, the loose top tool according to an embodiment of the invention is exemplified in the form of a twist drill, which includes a basic body 1 and a loose top 2, in which the requisite cutting edges 3 are included. In its assembled, operative state according to FIG. 1, the tool is rotatable around a geometrical center axis designated C, more precisely in the direction of rotation R. The basic body 1 includes front and rear ends 4, 5 between which a center axis C1 specific to the basic body extends. In the backward direction from the front end 4, a cylindrical or rotationally symmetrical envelope surface 6 extends, in which two chip flutes 7 are countersunk, which in this case are helicoidal but which also may be straight. In the example, the chip flutes 7 terminate in a collar 8, separating the front part 9 of the basic body from a rear part 10, which has a diameter that is greater than that of the part 9, and is intended to be attached to a driving machine (not shown).

Also the loose top 2 includes front and rear ends 11, 12 and an own center axis C2, with which two envelope part surfaces 13 are concentric. Between the envelope part surfaces 13, two helicoidal chip flute sections are countersunk in the form of concave surfaces 14, which form extensions of the chip flutes 7 of the basic body 1 when the loose top is mounted to the basic body. If the loose top 2 is centered correctly in relation to the basic body 1, the individual center axes C1 and C2 coincide with the center axis C of the assembled tool.

Since the major part of the basic body 1 lacks interest in connection with the invention, henceforth only the front end portion thereof will be illustrated together with the loose top 2, more precisely on an enlarged scale.

Figure 5:
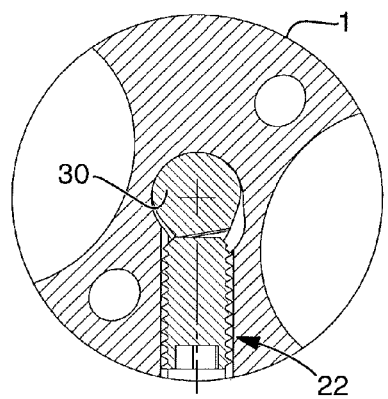
FIG. 5 is a section V-V in FIG. 4, showing a locking screw in contact with a centering pin of the loose top.
Figure 6:
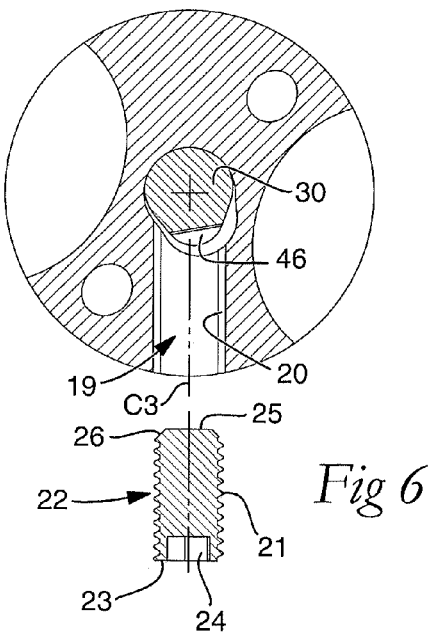
FIG. 6 is an analogous section showing the screw separated from the basic body.
Figure 7:
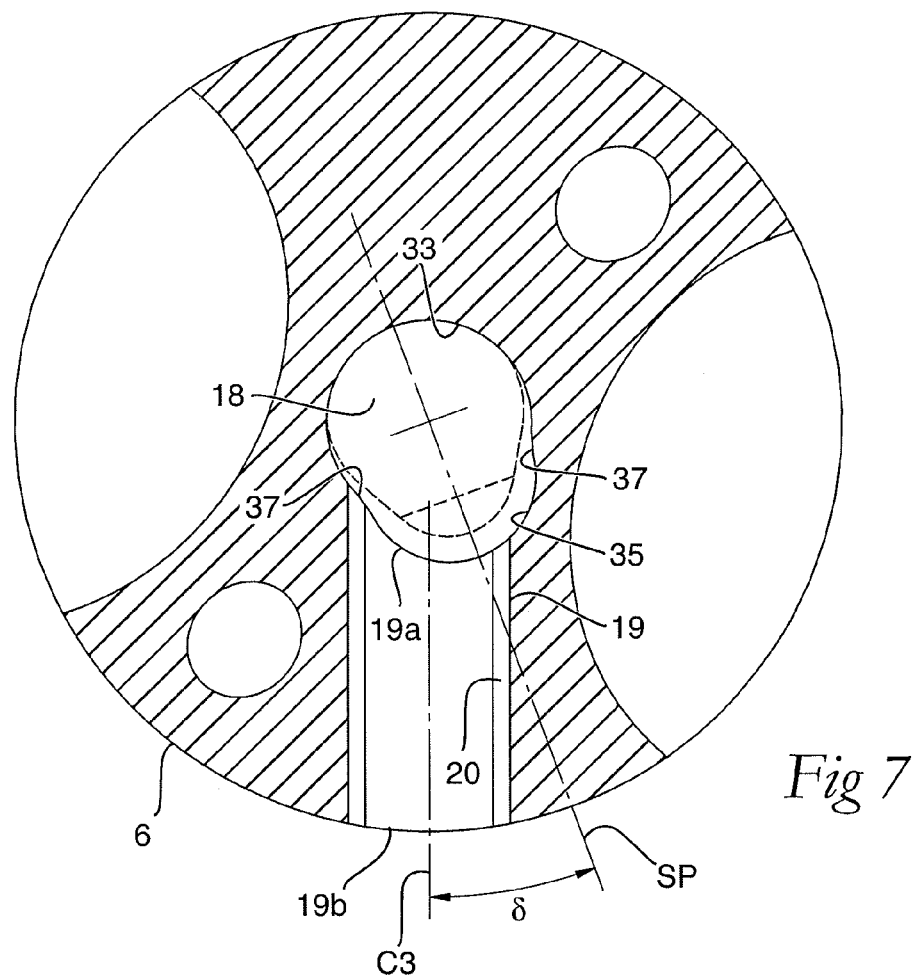
FIG. 7 is an additional enlarged cross-section through only the basic body.

As is seen in FIG. 3, a jaw 15 is formed in the front end 4 of the basic body 1 and that is delimited by two diametrically opposed drivers 16*a*, 16*b* as well as by an intermediate bottom 17, which in this case is in the form of a plane surface that extends perpendicular to the center axis C1. In this case, the drivers 16*a*, 16*b* are non-compliant lugs, contrary to elastically compliant branches. In the bottom 17, a center hole 18 mouths that extends axially into the basic body so far that a screw hole 19 (see FIGS. 5-7) can mouth therein. The screw hole 19 is formed with a female thread 20 and concentrically with a geometrical center axis C3 that extends radially inside the basic body, in this case perpendicular to the center axis C1 of the basic body. Note that the screw hole 19 is recessed in the material that is present between the two concave surfaces that form the chip flutes 7. In FIG. 7, it is furthermore seen that the screw hole 19 extends between an inner mouth 19*a*, which opens in the center hole 18, and an outer mouth 19*b*, which opens in the envelope surface 6 of the basic body. The female thread 20 of the screw hole 19 co-operates with a male thread 21 (see FIG. 6) of a screw 22, which in a rear end 23 includes a key grip 24 for a tool (not shown), by which the screw can be tightened into and loosened from, respectively, the screw hole 19. In this case, the front end of the screw 22 includes a plane end surface 25 as well as a conical surface 26, which forms a transition surface between the end surface 25 and the male thread 21.

Figure 4:
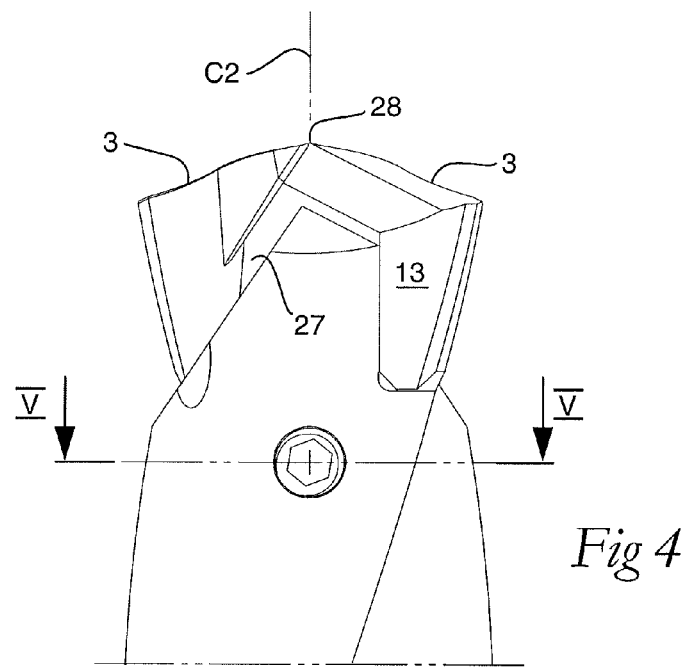
FIG. 4 is a partial side view showing a front part of the basic body having a mounted loose top.

In the shown, preferred example, the loose top 2 is a single, simple head, which laterally is delimited by two opposite, plane contact surfaces 27 in addition to the envelope part surfaces 13 and the concave surfaces 14 forming chip flute sections. In the backward direction, the head is delimited by a plane surface that extends perpendicular to the center axis C2 and forms the rear end 12 of the loose top. As pointed out previously, the two cutting edges 3 are included in the front portion of the loose top. More precisely, the two cutting edges 3 converge into a central tip 28 (see FIG. 4) situated along the center axis C2 of the loose top. The side contact surfaces 27 of the loose top co-operate with the insides of the drivers 16*a*, 16*b*, which are in the form of plane surfaces 29 (see FIG. 3). In the operative state of the tool, the rear end surface 12 of the loose top is held pressed against the plane surface that forms the bottom 17 of the jaw 15 at the same time as the two side contact surfaces 27 of the loose top are held pressed against the support surfaces 29 of the insides of the drivers. In this operative state, a centering pin 30 is inserted in the center hole 18 and that protrudes axially rearward from the rear end surface 12 of the loose top 2. In the example, the rear, free the end of said pin 30 is represented by a plane end surface 31, while the front end designated 32, which is an integrated part of the loose top, is represented by a circumferential boundary line between the pin 30 and the end surface 12.

Reference is now made to FIGS. 5-10, which more in detail illustrate the nature of the centering pin 30 and center hole 18.

Figure 9:
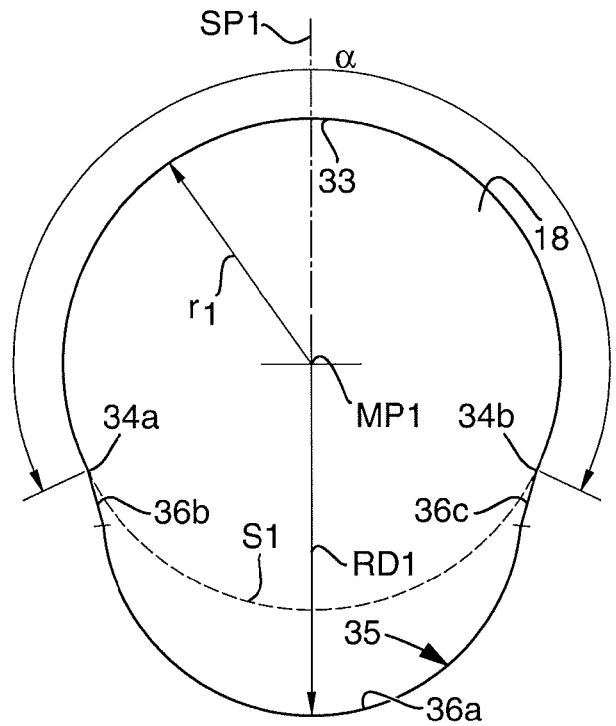
FIG. 9 is a schematic picture showing the geometrical design of the center hole in detail.

The cross-sectional shape characteristic for the center hole 18 is best seen in FIGS. 7 and 9. A first part surface 33 included in the inside of the hole (i.e. the hole wall) is cylindrical and has an axial as well as a peripheral extension in order to serve as a support surface for the centering pin 30. The circle that defines the cylinder shape of the support surface 33 has a center MP1 coinciding with the center axis C1 of the basic body. The radius of the support surface 33 is designated r1, and the peripheral extension thereof is determined by two boundary generatrices 34*a*, 34*b* between which the arc angle α, in this case, is greater than 180°. Thus, in the concrete example according to FIGS. 7 and 9, a amounts to approx. 230°. In the inside of the center hole 18, there is further included a part surface in the form of a clearance surface generally designated 35, which, like the support surface 33, has an axial extension as well as a peripheral one. In this clearance surface 35, a plurality of part surfaces 36*a*, 36*b*, 36*c* are included, the part surface 36*a* of which is concave and in this case cylindrical, while the part surfaces 36*b*, 36*c* are plane and form transition surfaces between the support surface 33 and the part surface 36*a*. As is seen to the naked eye in FIG. 9, the radius (lacks designation) of the part surface 36*a* is smaller than the radius r1 of the support surface 33. In the example, the two part surfaces 36*b* and 36*c* converge toward the part surface 36*a*, whereby the center hole 18 is imparted a drip-like cross-sectional shape.

Further, in FIG. 9, S1 designates a circle that is inscribed along the cylinder surface 33 and therefore has the same radius r1 as cylinder surface 33. In FIG. 9, it is furthermore seen that a symmetry plane SP1 divides the center hole 18 into two mirror-symmetrical halves.

Figure 8:
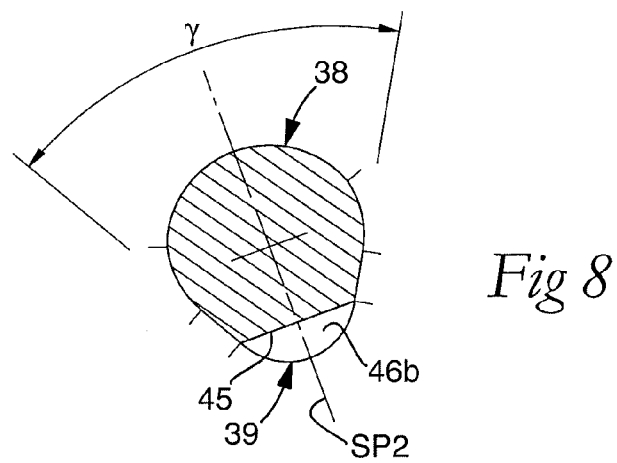
FIG. 8 is a cross-section through the centering pin of the loose top.
Figure 10:
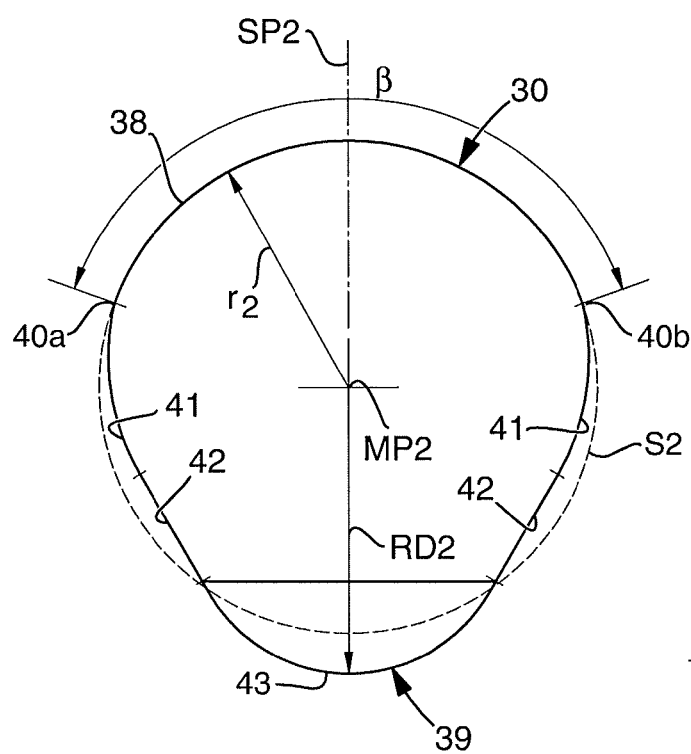
FIG. 10 is an analogous picture showing the geometrical design of the centering pin.

Reference is now made to FIGS. 8 and 10, which illustrate the geometrical design of the centering pin 30. Like the center hole 18, the pin 30 has a generally drip-like cross-sectional shape that essentially is determined by a contact surface designated 38 as well as by a clearance surface in its entirety designated 39. In this case, the contact surface 38 is cylindrical and extends between two boundary generatrices 40*a*, 40*b*, more precisely along an arc angle β that should be less than 180°. In the example according to FIG. 10, β amounts to approx. 140°. However, β may vary upward as well as downward from this value provided that the value is less than 180°.

In the clearance surface 39 of the centering pin, a plurality of part surfaces are included, viz. a pair of convex transition surfaces 41 and a pair of plane part surfaces 42 that converge in the direction from the contact surface 38 toward a common, convex back surface 43. In FIG. 8, it is seen that the angle of convergence γ between the surfaces 42 amounts to approx. 60°. The center MP2 of the circle that defines the cylindrical shape of the contact surface 38 coincides with the center axis C2 of the loose top 2. In other words, the surface 38 is concentric with the center axis of the loose top and has a radius r2. Thus, a circumscribed circle S2 along the external, cylindrical contact surface 38 has the radius r2.

In this connection, it should be pointed out that the contact surface 38 does not necessarily have to be cylindrical. Thus, the same may, for instance, have an elliptical shape provided that the radial distances or the radii r2 between the center MP2 (=C2) and the two boundary generatrices 40*a*, 40*b* are equally large.

A feature of the invention is that the cross-sectional area of the center hole 18 is larger than the cross-sectional area of the centering pin 30 in order for the external clearance surface 39 of the centering pin to clear from the internal clearance surface 35 in the center hole, as is clearly shown in FIG. 7. A characteristic feature is further that the circumscribed circle S2 of the contact surface 38 has the same radius r2 as the radius r1 of the inscribed circle S1 of the internal support surface 33 (i.e., r1 and r2 are equally great). In addition, a greatest radial distance RD2 between the center axis of the loose top, i.e., the center MP2 in FIG. 10, and a point on the clearance surface 39, on one hand, is greater than the radius r2 of the circumscribed circle S2, but, on the other hand, smaller than a greatest radial distance RD1 between the center axis C1 (=MP1 in FIG. 9) of the basic body and the internal clearance surface 35. As a consequence of this geometry, the centering pin can only be inserted into the center hole in one way, viz.

with the comparatively slender back surface 43 facing the internal clearance surface 35 in the center hole. Should the loose top by misadventure be held rotated 180° in relation to the position according to FIG. 7, any insertion of the centering pin 30 into the center hole 18 is accordingly made impossible.

Also the cross-section of the centering pin 30 is divided into two mirror-symmetrical halves by a symmetry plane SP2.

As may be best seen in FIG. 3, in the centering pin 30, more precisely the clearance surface 39 thereof, a seat 44 is countersunk, which is spaced apart from the free end 31 of the pin and includes a bottom surface 45, which in this case is plane and transforms into two plane chamfer surfaces 46*a*, 46*b*, which individually form an obtuse angle with the bottom surface 45. The rear one of these chamfer surfaces, viz. the chamfer surface 46*b* (see FIG. 2), forms a stop surface for the screw 22. More precisely, the cone surface 26 of the screw will be pressed against the surface 46*b*, thereby preventing the centering pin from being pulled out of the center hole. Furthermore, the front end surface 25 of the screw will partially be pressed against the bottom surface 45 of the seat 44, more precisely with the purpose of applying a torque to the pin that aims at pressing the two side contact surfaces 27 of the loose top against the internal support surfaces 29 of the drivers 16*a*, 16*b*. In order to allow such a rotation, the screw is generally inclined in relation to the bottom surface 45 of the seat. Thus, in FIG. 7, it is seen how the center axis C3 of the threaded hole 19 and the symmetry plane SP1 through the center hole 18 form an angle δ with each other. In FIG. 7, the angle δ is exaggerated (amounts to approx. 20°) for the sake of clarity. In practice, the same may, however, be limited to the order of 2-5°.

In the preferred embodiment, the surface 43 of the centering pin extends from the free end of the pin (and runs—with the exception of the seat 44—all the way up to the rear end surface 12 of the loose top). In such a way, it is ensured that the centering pin 30 cannot even partially be incorrectly inserted into the center hole 18. Should the loose top be turned the wrong way, accordingly not even the free end of the centering pin could be brought into the center hole, and therefore the operator could quickly correct the error.

In FIG. 3, it is furthermore seen that the mouth of the center hole 18 includes a conical surface 47 having the purpose of facilitating the insertion of a correctly turned centering pin into the hole.

When the loose top 2 is to be mounted in the jaw 15 of the basic body 1, the screw 22 is unscrewed a bit from the screw hole 19 in order not to stick into the center hole 18. Therefore, if the loose top 2 is turned the right way, the centering pin 30 can freely be inserted into the center hole until the rear end surface 12 of the loose top is pressed against the bottom surface 17 of the jaw. In the next step, the screw 22 is tightened, a slight rotary motion (e.g. 2 to 5°) being applied to the loose top, as mentioned previously, which ensures that the two side contact surfaces 27 of the loose top are pressed against the internal support surfaces 29 of the drivers 16*a*, 16*b*. Simultaneously, the front, conical surface 26 of the screw 22 is pressed against the rear stop surface 46*b* in the seat 44. In such a way, also a (positive) axial force is applied to the loose top, by which the end surface 12 thereof in a mechanical way is pressed against the bottom surface 17 of the jaw. In this state, the loose top is locked in an operative state. During drilling, the torque applied to the loose top via the drivers 16*a*, 16*b* is strong enough to hold the drivers pressed against the side contact surfaces 27 without the help of the screw. In addition to preventing retraction of the loose top from the jaw (e.g. in connection with retraction of the drill from a drilled hole), accordingly the screw has foremost the purpose of initially clamping the loose top so that the loose top is not moved from its position in connection with the entering of a workpiece.

When the loose top 2 is to be replaced, the centering pin 30 thereof can easily be pulled out of the center hole 18 after the simple measure of unscrewing the screw 22 a bit from the screw hole 19. Thus, the retraction offers no frictional resistance because the cross-sectional area of the center hole 18 is larger than the cross-sectional area of the centering pin 30.

Should the operator in connection with mounting peradventure hold the loose top turned the wrong way, i.e., with the back surface 39 facing the support surface 33 in the center hole, instead of facing the clearance surface 35, any attempt to introduce the pin even a short distance into the hole is made impossible.

In addition to the invention obviating the risk of incorrect mounting of the loose top in a foolproof way, the same affords the advantage of a very meticulous centering of the loose top in relation to the basic body at the same time as mounting as well as dismounting of the loose top can be carried out in a fast and easy way. Another advantage of the invention, as a consequence of the simple axial locking of the loose top by the radial screw, is that the side contact surfaces of the loose top as well as the co-operating support surfaces of the insides of the drivers can be manufactured at high accuracy and by simple means. In particular, the receiving jaw in the basic body can be produced in a single simple working operation, e.g. by a slitting cutter or a grinding disc. In addition, the centering pin of the loose top can be made with extra great strength because much material (cemented carbide) can be incorporated into the same, more precisely as a consequence of the clearance surface thereof being accommodated in a clearance space situated radially outside the inscribed circle of the support surface (contrary to a genuinely cylindrical center hole, which necessitates a reduction of the cross-sectional area of the centering pin).

Figure 11:
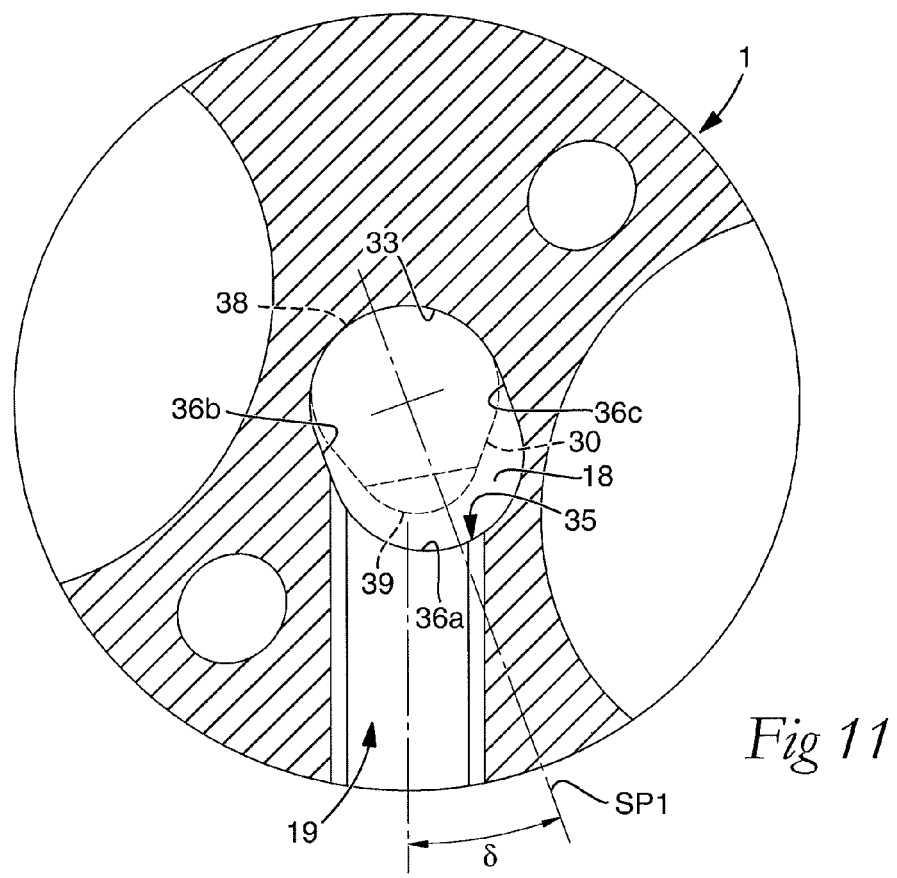
FIG. 11 is a cross-section through a basic body the center hole of which has an alternative design.

Reference is now made to FIG. 11, which illustrates a basic body 1 the center hole 18 of which has a design other than the drip-shaped center hole in the previously described embodiment. Thus, in this case, two plane part surfaces 36*b*, 36*c*, which are included in the clearance surface 35 together with a concave, cylindrical part surface 36*a*, are mutually parallel. This means that the center hole 18 obtains an oval cross-sectional shape and that not only the support surface 33 but also the part surface 36*a* becomes genuinely semi-cylindrical. The centering pin 30 outlined by dashed lines has, however, still the drip-like cross-sectional shape described previously. The oval cross-sectional shape of the hole 18 means in practice that the crescent-shaped gap between the internal clearance surface 35 and the external clearance surface of the centering pin 30 becomes larger than in the preceding case.

It is possible to modify the described tool within the scope of the invention. For instance, the loose top may be formed with a particular coupling part between the centering pin and the front head in which the cutting edges are included. Furthermore, the screw hole may be placed at an acute instead of a right angle to the center axis of the basic body, more precisely in a direction obliquely rearward/inward from the envelope surface in order to accentuate the axial force component applied to the centering pin by the screw. The front end of the tightening screw may also be given other shapes than the shown one, e.g. pointed, at the same time as the seat in the centering pin is modified to co-operate with the screw in an efficient way. For instance, the rear stop surface could be made concave instead of plane. As pointed out previously, the contact surface of the centering pin may further be given other shapes than cylindrical, e.g. elliptical. The clearance surfaces of the centering pin as well as of the center hole may also be given varying shapes.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A rotatable tool for chip removing machining, comprising:
   a basic body having front and rear ends between which there extends a first geometrical center axis (C1) around which the basic body is rotatable in a predetermined direction of rotation; and
   a loose top having front and rear ends between which a second geometrical center axis (C2) extends;
   the front end of the basic body including a jaw, which is delimited by two drivers and an intermediate bottom and in which a part of the loose top is received,
   a centering pin protruding axially rearward from the loose top being inserted in an axial center hole, which mouths in the bottom of the jaw and in which a threaded hole mouths for a screw co-operating with the center pin,
   the center hole including a cylindrical support surface, which is concentric with the center axis (C1) of the basic body and against which the centering pin of the loose top is pressed by the screw,
   the centering pin of the loose top including first and second diametrically opposed, external surfaces, each having an axial extension and a peripheral extension, the first external surface forming a contact surface that is pressed against the support surface of the center hole and extends tangentially between two axially extending boundary generatrices, which are situated along an imaginary first circle (S2) having a first center (MP2) coinciding with the center axis (C2) of the loose top, and between which an arc angle (β) is less than 180°, the second external surface forming a clearance surface that lacks contact with the inside of the center hole as a consequence of the cross-sectional area of the centering pin being smaller than the cross-sectional area of the center hole,
   wherein the imaginary first circle (S2) has a first radius (r2) that is equally great as a second radius (r1) of an imaginary second circle (S1) having a second center (MP1) coinciding with the center axis (C1) of the basic body and that includes the cylindrical support surface of the center hole, and
   wherein a greatest radial distance (RD2) between the center axis (C2) of the loose top and a point on the clearance surface of the centering pin is greater than the first radius (r2) of the imaginary first circle (S2) but smaller than a corresponding distance (RD1) between the center axis (C1) of the basic body and a clearance surface situated in the center hole and opposite the support surface.

2. The tool according to claim 1, wherein the contact surface and the clearance surface of the centering pin extend from a free end of the centering pin to prevent an incorrect insertion of the centering pin even partially into the center hole.

3. The tool according to claim 1, wherein a seat is countersunk in the clearance surface of the centering pin for cooperation with the screw, the seat being spaced apart from a free end of the centering pin and including a bottom surface and a stop surface situated axially rearward of the bottom surface.

4. The tool according to claim 3, wherein the bottom surface and stop surface of the seat are plane and form an obtuse angle with each other.

5. The tool according to claim 1, wherein the center hole in the basic body has a cross-sectional shape in which the clearance surface of the center hole includes two part surfaces interconnected by a concave part surface and wherein the two part surfaces converge toward the concave part surface.

6. The tool according to claim 1, wherein the center hole in the basic body has an oval cross-sectional shape in which the clearance surface of the center hole includes two part surfaces that extend parallel to each other in a direction from the support surface toward the concave part surface.

7. The tool according to claim 5, wherein the centering pin of the loose top has a cross-sectional shape in which the clearance surface of the centering pin includes two part surfaces that converge in a direction from the contact surface toward a back surface of the clearance surface.

8. A loose top for rotatable tools for chip removing machining, comprising:
   a head including front and rear ends between which a geometrical center axis (C2) extends; and
   a centering pin protruding axially rearward from the rear end of the head, the centering pin including first and second diametrically opposed, external surfaces, each having an axial extension and a peripheral extension, the first external surface forming a contact surface that extends peripherally between two axially extending boundary generatrices, which are situated along an imaginary circle (S2) having a center (MP2) coinciding with the center axis (C2), and between which an arc angle (β) is less than 180°, the second external surface forming a clearance surface that extends peripherally from the two axially extending boundary generatrices and includes two part surfaces and a back surface,
   wherein the rear end of the head has a radially extending plane surface that extends radially outward of the contact surface and the clearance surface relative to the geometrical center axis,
   wherein, in a plane perpendicular to the center axis (C2) at a first axial position of the centering pin, a first radial cross-section of the centering pin includes a first contact surface and a first clearance surface,
   wherein, in the first radial cross-section, a greatest radial distance (RD2) between the center axis (C2) and a point on the first clearance surface is greater than the radius (r2) of the imaginary circle (S2) containing the first contact surface, and
   wherein, in the first radial cross-section, the two part surfaces converge in a direction from the first contact surface toward the back surface of the first clearance surface.

9. The loose top according to claim 8, wherein the contact surface and the clearance surface of the centering pin extend axially forward from a free end of the centering pin.

10. The loose top according to claim 8, wherein a seat is countersunk in the clearance surface of the centering pin for cooperation with a screw, the seat being spaced apart from a free end of the centering pin and spaced apart from the first axial position, and wherein the seat includes a bottom surface and a stop surface situated axially rearward of the bottom surface.

11. The loose top according to claim 10, wherein the bottom surface and the stop surface are plane and form an obtuse angle with each other.

12. A basic body for rotatable tools for chip removing machining, comprising:
   an envelope surface and front and rear ends, between which a geometrical center axis (C1) extends,
   wherein the front end includes jaw delimited by two drivers and an intermediate bottom in which an axially extending center hole mouths, a hole for a screw extending between the center hole and the envelope surface,
   wherein the center hole is delimited by a cylindrical support surface, which is concentric with the center axis (C1) and which is positioned on a portion of a circle (S1) having a radius (r1), and by an opposite clearance surface situated radially outside an imaginary projection of the circle (S1), and
   wherein the center hole has a cross-sectional shape in which the clearance surface includes two part surfaces.

13. The basic body according to claim 12, wherein the two part surfaces converge toward a concave part surface included in the clearance surface.

14. The basic body according to claim 12, wherein the two part surfaces extend parallel to each other from the cylindrical support surface toward a part surface that has a semi-cylindrical shape.

15. The basic body according to claim 14, wherein the cross-sectional shape of the center hole has an oval shape.

16. The tool according to claim 5, wherein the centering pin of the loose top has a cross-sectional shape bounded by a contact surface,
   wherein a first portion of the contact surface is cylindrical and extends between two boundary generatrices along the arc, and
   wherein a second portion of the contact surface includes a pair of convex transition surfaces and a pair of plane part surfaces that converge in a direction from the first portion of the contact surface toward a convex back surface of the clearance surface.

17. The loose top according to claim 8, wherein the two part surfaces are planar,
   wherein the clearance surface includes a pair of convex transition surfaces, and
   wherein, in the first radial cross-section, the two part surfaces are connected to the contact surface by the transition surfaces.

18. The tool according to claim 1, wherein the center hole in the basic body has a cross-sectional shape in which the clearance surface of the center hole includes two part surfaces separated by a concave part surface, and wherein the two part surfaces (a) join to the support surface non-tangentially or (b) extend parallel to each other toward the concave part surface.

19. The tool according to claim 18, wherein, when the two part surfaces join to the support surface non-tangentially, the two part surfaces are interconnected by a concave part surface and the two part surfaces converge toward the concave part surface.

20. The tool according to claim 18, wherein, when the two part surfaces extend parallel to each other toward the concave part surface, the two part surfaces to provide the center hole in the basic body an oval cross-sectional shape in which the clearance surface of the center hole includes two part surfaces that extend parallel to each other in a direction from the support surface toward the concave part surface.

* * * * *